Jan. 14, 1936.  B. S. HAMER  2,027,478
HUB LAMP
Filed Aug. 13, 1934   2 Sheets-Sheet 1
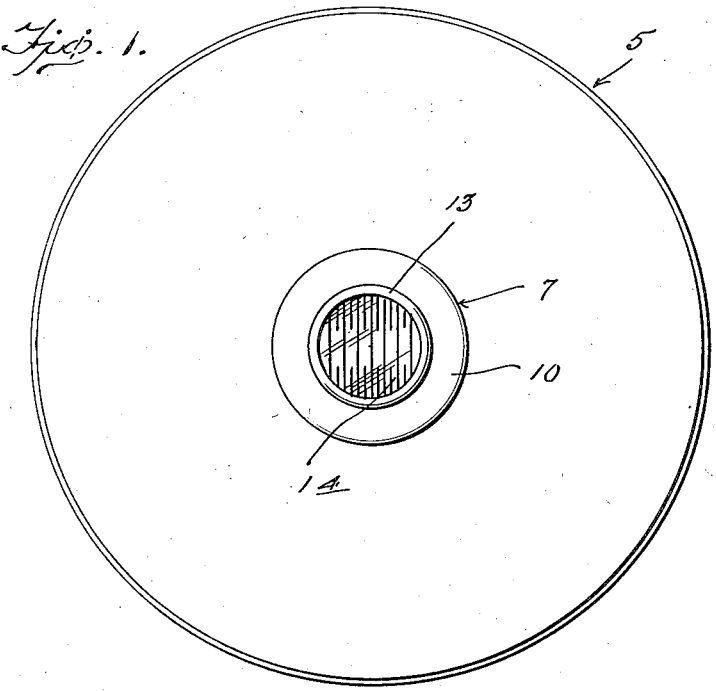
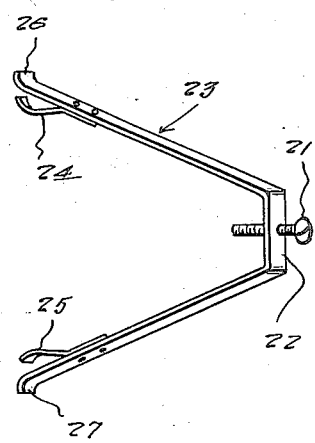
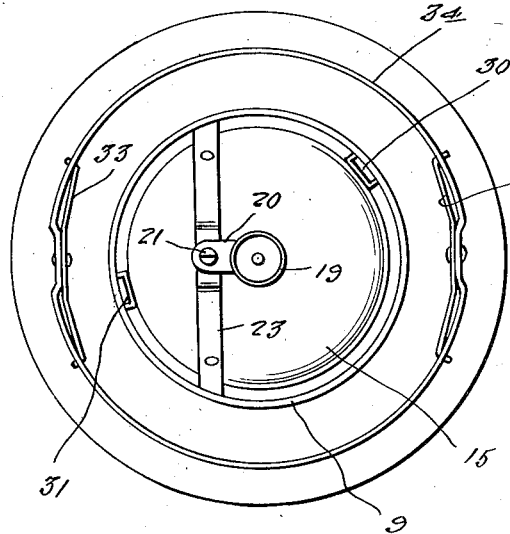
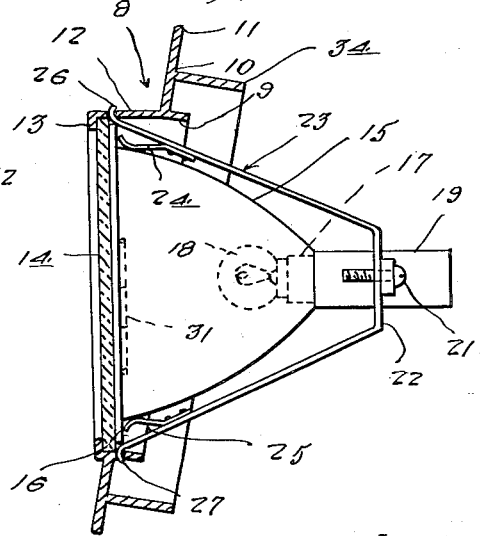
Inventor
Beverly S. Hamer
By Clarence A. O'Brien
Attorney Jan. 14, 1936.  B. S. HAMER  2,027,478
HUB LAMP
Filed Aug. 13, 1934  2 Sheets-Sheet 2
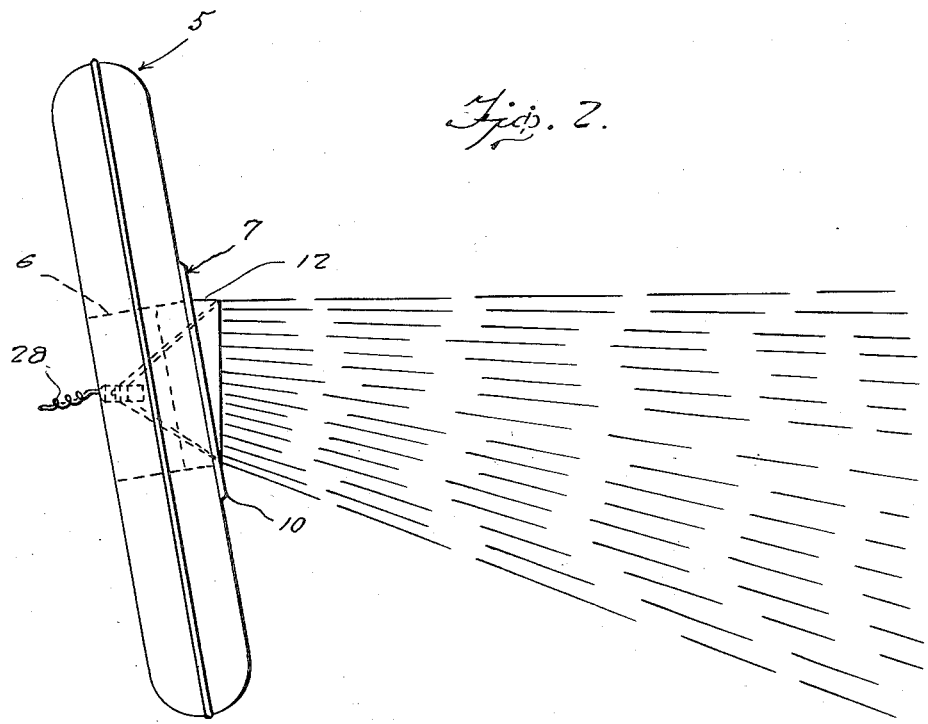
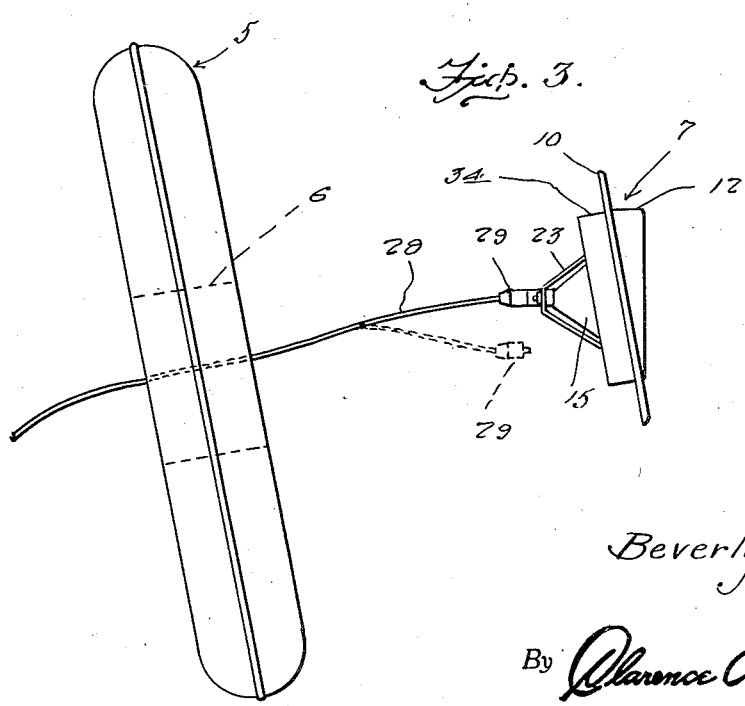
Inventor
Beverly S. Hamer
By Clarence A. O'Brien
Attorney Patented Jan. 14, 1936

2,027,478

UNITED STATES PATENT OFFICE 2,027,478

HUB LAMP

Beverly Sims Hamer, Austin, Tex.

Application August 13, 1934, Serial No. 739,654

1 Claim. (Cl. 240—8.12)

My invention relates generally to vehicle lamps, and particularly to a combined backing light and trouble lamp especially adapted for incorporation in the hub of the rear spare wheel of an automobile, and an important object of the invention is to provide a lamp of this character which is simple and inexpensive and may be made in the form of a dummy hub cap to replace the ordinary hub cap on a spare wheel of the automobile.

Another important object of my invention is to provide a lamp of the character described above which is readily removable so as to be capable of being carried to a point at some distance from its stationary mounting, to enable use thereof as a trouble lamp at a point remote from its stationary mounting or for other lighting purposes.

Other objects and advantages of my invention will be apparent from a reading of the following description in connection with the drawings, wherein for purposes of illustration I have shown a preferred embodiment of my invention.

In the drawings:—

Figure 1 is an elevational view of the rear of a spare wheel showing a hub lamp in accordance with the invention.

Figure 2 is a side elevational view of Figure 1 showing in dotted lines the arrangement of the hub lamp.

Figure 3 is a view similar to Figure 2 showing the hub lamp removed from the spare wheel for use at a point remote from the spare wheel.

Figure 4 is a transverse vertical sectional view through the hub lamp.

Figure 5 is a view of the rear of the dummy hub cap having the lamp mounted therein.

Figure 6 is a perspective view of the brace.

Referring in detail to the drawings, the numeral 5 generally designates a spare automobile wheel having in the usual position thereon with respect to the hub 6 of the wheel the hub cap 7 which in the present instance has the front thereof provided with an opening arranged to expose the lamp which is generally designated 8 which then occupies a position within the hub 6 of the wheel as indicated in Figure 2.

The hub structure generally designated 8 comprises an annulus 9 which has at its outer end a lateral radially outwardly projecting flange 10 which may be suitably rounded at its edges as indicated at 11 to conform in appearance and blend with the hub 7 whose outer end it abuts while the annulus 9 is telescoped therein.

Outwardly of the flange 10 is the annular part 12 which is cut at such an angle that when the flange 10 is in place on the normally slanting wheel, the plane of the outer end of the annular portion 12 will be substantially vertical as indicated in Figure 2.

The annular portion 12 has a radially inwardly projecting flange 13 which acts as a retainer for the lens 14 which is preferably formed to cast the light rays downwardly so as to illuminate the road directly to the rear of the automobile when in use as a backing light.

Directly engaging the back of the lens 14 is the parabolic reflector 15 which has a radially outwardly projecting rim 16 and at its inward end a socket 17 receiving in conventional manner the bulb 18. In accordance with the invention an extension socket 19 projects from the inward end of the reflector 15 in alignment with the socket 17, and the extension socket 19 has a lateral arm 20 which is adapted to receive a bolt 21 which is attached to the bight portion 22 of a truncated V-shaped brace which is generally designated 23.

The brace 23 has spring hook members 24, 25 attached to the inner side of the arms thereof in such a position as to engage their ends with the rear of the rim 16 on the reflector to hold the reflector in place against the back of the lens 14. Hook portions 26, 27 on the extremities of the legs of the brace engage through receiving openings in the annular portion 12 and in the annulus 9 as shown in Figure 4 whereby the brace is held in position and enabled to perform its bracing functions.

The lateral arm 20 which is traversed by the bolt 21 is attached to the bight portion 22 of the brace by reason of the threading of the bolt 21 in the bight portion 22 so that the reflector 15 is additionally rigidly held in position with respect to the parts engaged therewith and the extension socket arrangement is strengthened and securely held in position.

An extension cord 28 having a suitable socket 29 at its outer end may be of any suitable length and arranged to be stored within the hub of the wheel so as to be extensible therefrom when the lamp is to be removed as indicated in Figure 3 for use at a remote point. The socket 29 is receivable in and adapted to be connected to the socket extension 19 to energize the bulb 18. It is obvious that a suitable control switch may be provided at any convenient place on the automobile.

Figure 5 shows spring loops 30, 31 which are on the reflector 15 and are arranged to act as spring locks in engaging the interior of the annular portion 12, to better hold the reflector and the lens against rattling and coming loose.

With the lamp installed as indicated in Figure 2 the whole lamp assembly may be removed simply by prying the dummy hub cap away from the wheel in such a manner as to overcome the locking tendency of the spring locks 32, 33 which are provided in the annulus 34 as obtains in the regular hub cap, so that the whole may be removed in the condition shown in Figure 3. Restoration of the lamp on the wheel is accomplished simply by pressing the dummy hub cap into place again as in replacing an ordinary hub cap.

Although I have shown and described herein a preferred embodiment of my invention, it is to be definitely understood that I do not desire to limit the application of the invention thereto, and any change or changes may be made in materials and in the structure and arrangement of parts, within the spirit of the invention and the scope of the subjoined claim.

What is claimed is:—

A hub lamp comprising a hub cap, including a cover part, a tubular member extending through the cover part and having a portion located in the cap and another portion projecting from the cap, the distance of the outer end of the last mentioned portion from the outer face of the cover portion gradually increasing from the bottom of said last mentioned portion to the top thereof, a transparent member in the outer end of the tubular portion, a reflector and bulb assembly mounted behind the transparent member and supported from the tubular part, and the supporting means including a yoke having hook extremities and the tubular member having holes therein receiving said extremities, and spring members carried by the yoke and engaging the reflector.

BEVERLY SIMS HAMER.